United States Patent

Spatafora

[11] Patent Number: 5,493,847
[45] Date of Patent: Feb. 27, 1996

[54] WRAPPING METHOD AND MACHINE, PARTICULARLY FOR FOOD PRODUCTS SUCH AS CHOCOLATES AND SIMILAR

[75] Inventor: Mario Spatafora, Bologna, Italy

[73] Assignee: Azionaria Costruzioni Macchine Automatiche A.C.M.A. S.p.A., Bologna, Italy

[21] Appl. No.: 187,716

[22] Filed: Jan. 28, 1994

[30] Foreign Application Priority Data

Jan. 29, 1993 [IT] Italy ................. BO93A0022

[51] Int. Cl.⁶ .................................. B65B 11/38
[52] U.S. Cl. ................. 53/461; 53/234; 53/251; 53/439
[58] Field of Search ............... 53/461, 439, 234, 53/235, 251, 250

[56] References Cited

U.S. PATENT DOCUMENTS 3,899,865  8/1975  Revaz ........................ 53/234
3,987,605  10/1976  Johnson ..................... 53/234
4,768,639  9/1988  Gamberini et al. .......... 53/234 X
4,993,211  2/1991  Piano ........................ 53/435
5,016,421  5/1991  Ferrero ...................... 53/234 X
5,220,993  6/1993  Scarpa et al. .............. 198/431

FOREIGN PATENT DOCUMENTS 3635387  4/1987  Germany .
1346757  2/1974  United Kingdom .
2220187  1/1990  United Kingdom .
2239227  6/1991  United Kingdom .

*Primary Examiner*—James F. Coan
*Attorney, Agent, or Firm*—Oblon, Spivak, McClelland, Maier & Neustadt

[57] ABSTRACT

A wrapping method and machine, particularly for food products such as chocolates and similar, whereby the products are fed in an orderly succession along a first curved path to a pickup station where they are gripped by respective gripping devices moving along a second curved path for feeding the products to a wrapping device; the first and second paths being substantially coplanar and substantially tangent to each other at the pickup station.

15 Claims, 3 Drawing Sheets

WRAPPING METHOD AND MACHINE, PARTICULARLY FOR FOOD PRODUCTS SUCH AS CHOCOLATES AND SIMILAR

BACKGROUND OF THE INVENTION

The present invention relates to a wrapping method, particularly for food products such as chocolates and similar.

The present invention relates particularly, but not exclusively, to a method of wrapping products such as chocolates and similar, whereby the products are first equally spaced and fed in orderly manner to a pickup station where they are gripped and fed by respective transfer members through a succession of folding stations for forming a known closed tubular wrapping about each product.

According to known wrapping methods of the aforementioned type, the products are normally fed to the pickup station on an input conveyor belt by which they are step advanced along a normally straight path, and the transfer members are normally supported on a wheel and are moved towards the conveyor belt at the pickup station for successively gripping the products.

In addition to requiring the use of relatively complex, high-cost actuators and control members, the forward movement of the transfer members makes it practically impossible to exceed a given operating speed.

SUMMARY OF THE INVENTION

It is an object of the present invention to provide a wrapping method designed to overcome the aforementioned drawbacks, and enabling decidedly greater operating speeds as compared with known methods of the aforementioned type.

According to the present invention, there is provided a wrapping method, particularly for food products such as chocolates and similar, comprising stages consisting in feeding the products in an orderly succession and along a first path to a pickup station; and successively gripping the products at the pickup station via pickup means moving along a second path for feeding the products to wrapping means; characterized by the fact that the first and second paths are curved paths substantially coplanar and substantially tangent to each other at the pickup station.

According to a preferred embodiment of the above method, the two paths are oppositely concave at the pickup station, are preferably at least partly circular, and preferably extend at least partly about respective preferably horizontal axes parallel to each other.

The present invention also relates to a wrapping machine.

According to the present invention, there is provided a wrapping machine, particularly for food products such as chocolates and similar, comprising input feed means for feeding an orderly succession of products to a pickup station along a first path; means for wrapping said products; and pickup means moving along a second path for successively gripping the products at the pickup station and feeding them to said wrapping means; characterized by the fact that the first and second paths are curved paths substantially coplanar and substantially tangent to each other at the pickup station.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
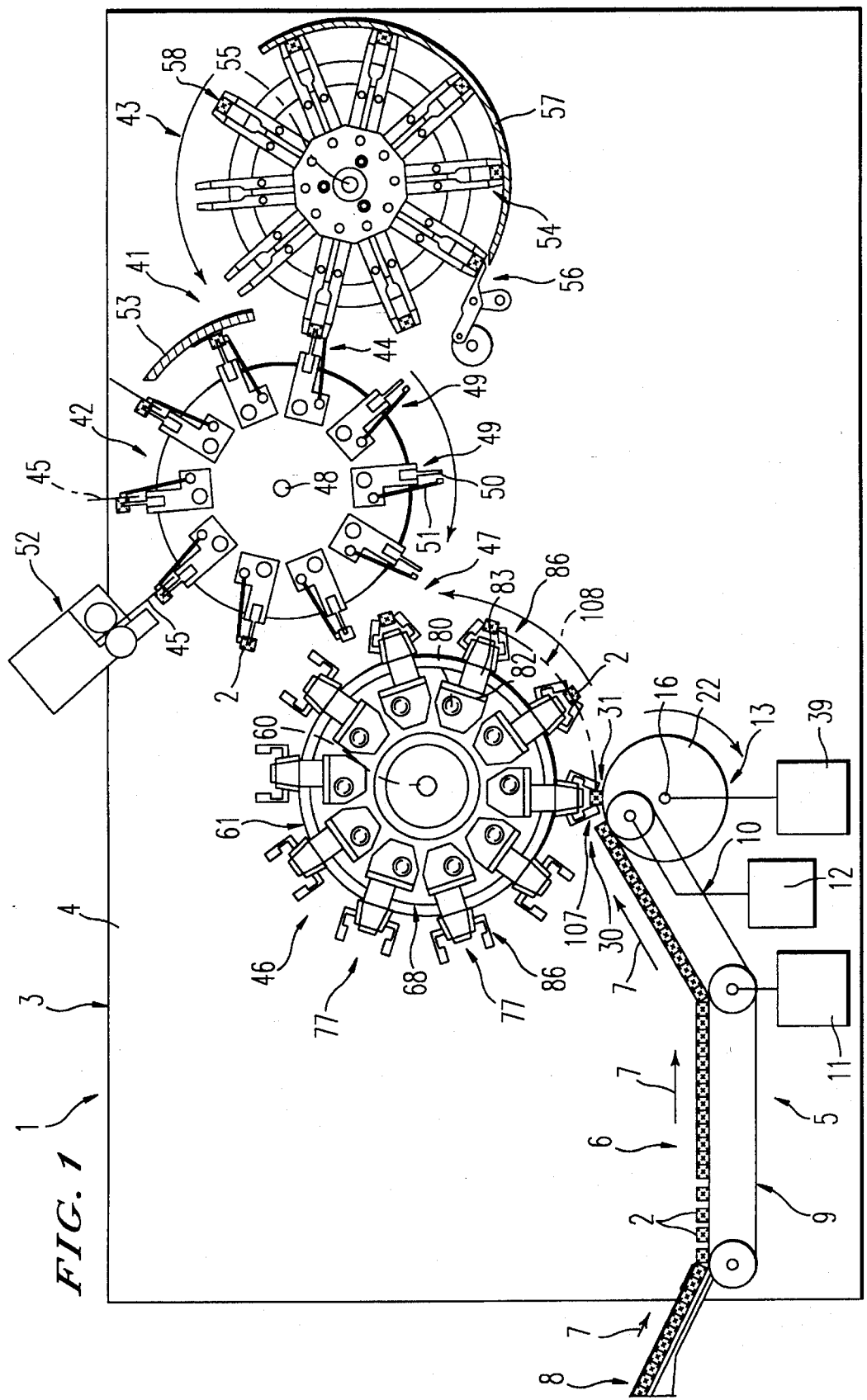
FIG. 1 shows a schematic front view, partly in blocks, of a preferred embodiment of the wrapping machine according to the present invention.

Number 1 in FIG. 1 indicates a wrapping machine for preferably, but not necessarily, elongated food products consisting in the example shown of chocolates 2, but which may alternatively consist of bars of chocolate, etc.

Machine 1 presents a frame 3 comprising a vertical front wall 4 adjacent to which is a device 5 for supplying chocolates 2 in an orderly succession. Device 5 comprises a compacting device 6 for receiving a random succession of chocolates 2 from a conveyor (not shown) and feeding them in direction 7 in such a manner as to bring them into contact with one another and so form an orderly succession.

As shown in FIG. 1, compacting device 6 comprises a downward-sloping input conveyor 8, a substantially flat intermediate conveyor 9, and an upward-sloping output conveyor 10 in series with one another; and two motors 11 and 12 for driving conveyors 9 and 10, consisting of conveyor belts, in direction 7 and in such a manner that the speed of conveyor 9 is at least equal to that of conveyor 10. Conveyor 8 on the other hand consists of a known pneumatic conveyor for pneumatically supporting chocolates 2 traveling in direction 7.

Compacting device 6 provides for feeding chocolates 2 successively to an accelerating device 13 by which they are fed forward separately with a given constant spacing.

Figure 2:
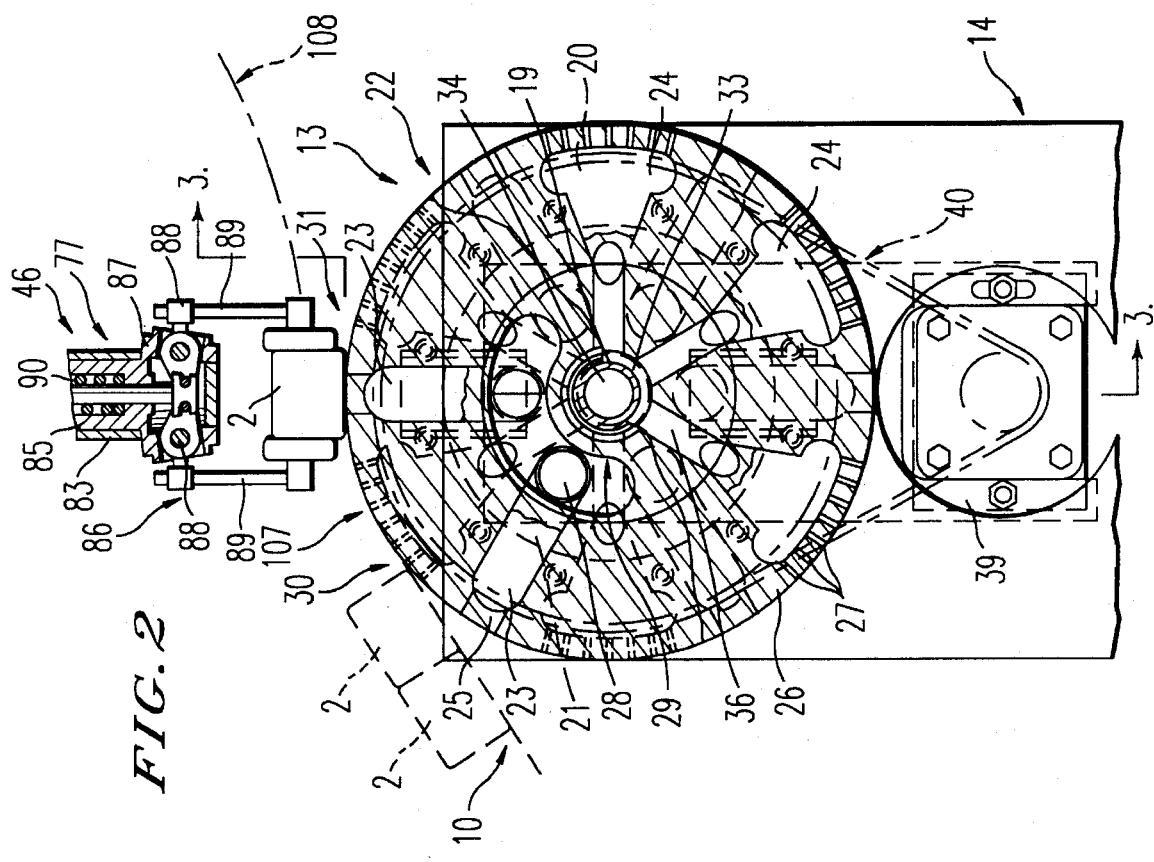
FIG. 2 is a section along line II—II in FIG. 3, showing a larger-scale detail of FIG. 1.
Figure 3:
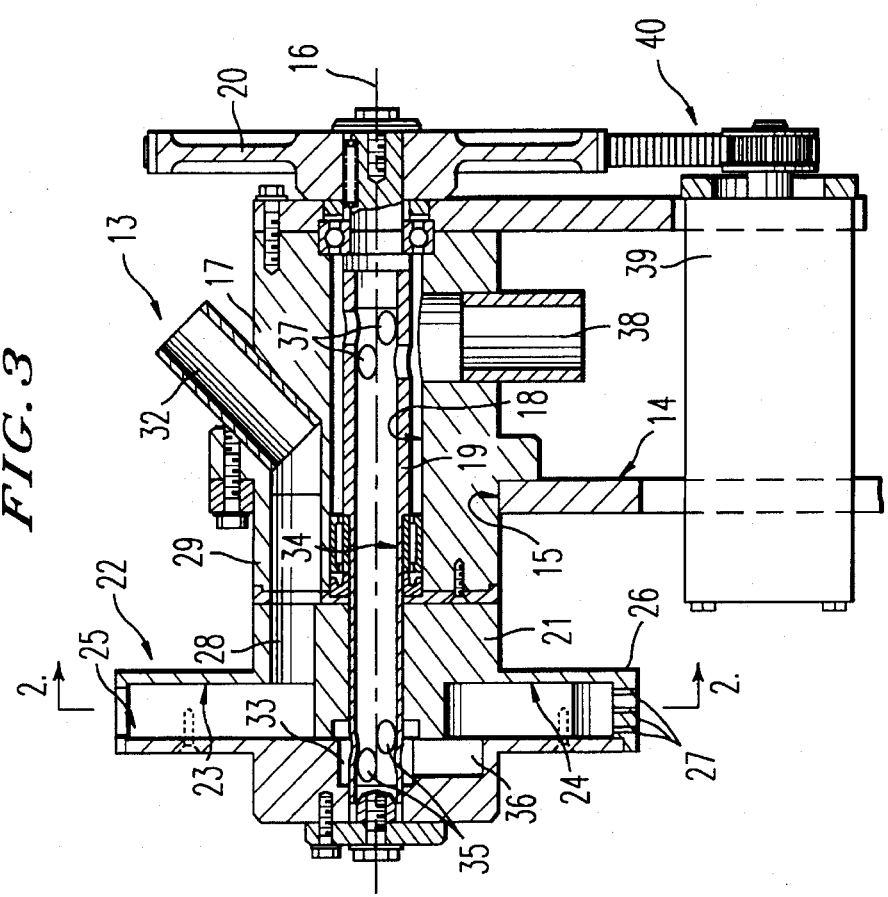
FIG. 3 shows a section along line III—III in FIG. 2.

As shown more clearly in FIGS. 2 and 3, device 13 comprises a vertical frame 14 having a through hole 15 with an axis 16 crosswise in relation to conveyor 10. Frame 14 is fitted integral with a tubular body 17 extending through hole 15 and having an axial conduit 18 in which is fitted for rotation a tubular shaft 19. A first end portion of shaft 19 extends outwards of tubular body 17 and is fitted with a pulley 20; and a second end portion of shaft 19 projects from the opposite end of tubular body 17 to that facing pulley 20, and is fitted with a central hub 21 of a wheel 22.

As shown more clearly in FIG. 1, wheel 22 is positioned vertically and, close to the top, is tangent to the output end of conveyor 10.

As shown in FIGS. 2 and 3, internally, wheel 22 presents alternate radial chambers 23 and 24, of which each chamber 23 communicates externally via a respective opening 25 formed through the outer rim 26 of wheel 22, and each chamber 24 communicates externally via a number of openings or holes 27 also formed through rim 26.

The inner end of each chamber 23 communicates with a respective conduit 28 formed axially through hub 21 towards tubular body 17 and designed to communicate with a curved chamber 29 formed in tubular body 17 facing wheel 22. In the rotation direction of wheel 22, chamber 29 extends over an arc between a loading station 30 at the point of tangency between conveyor 10 and rim 26, and an input or pickup station 31 at the top of wheel 22. Chamber 29 communicates with a conduit 32 formed through tubular body 17 and constituting the input conduit of a known suction device (not shown).

Internally, hub 21 presents an annular chamber 33 surrounding shaft 19 and communicating, on the one hand, with an axial conduit 34 inside shaft 19 via a number of radial holes 35 formed through shaft 19, and, on the other, with a number of radial conduits 36 extending outwards from chamber 33 and each communicating with the inner end of a respective chamber 24. Via a further number of radial holes 37 formed through shaft 19, conduit 34 communicates with conduit 18 which in turn communicates with a known blow device (not shown) via a conduit 38 extending radially through tubular body 17 and designed to feed pressurized fluid, in this case air, into conduit 34.

As shown more clearly in FIG. 3, the end of tubular body 17 facing pulley 20 supports a motor 39 connected to pulley 20 by a belt drive 40 for rotating wheel 22 (clockwise in FIG. 2) about axis 16 at a surface speed greater than the traveling speed of conveyor 10.

As shown in FIG. 1, machine 1 presents a wrapping device 41 comprising a first and second known wrapping drum 42 and 43 tangent to each other at a transfer station 44, and which provides in known manner for mating each chocolate 2 with a respective sheet 45 of wrapping material, and for folding sheet 45 about chocolate 2 to form a tubular wrapping. Device 41 also comprises a transfer device 46 for successively withdrawing chocolates 2 from device 5 at station 31, and feeding them successively on to drum 42 at transfer station 47.

Drum 42 is fitted to wall 4 so as to rotate clockwise (in FIG. 1) at substantially constant angular speed about a horizontal axis 48 perpendicular to wall 4, and comprises a number of radial gripping devices 49. Each device 49 comprises two jaws (only one shown) movable towards each other in a direction substantially perpendicular to wall 4, so as to cooperate with the opposite longitudinal ends of a respective chocolate 2 located in station 47 with its axis perpendicular to wall 4; and a further jaw 51 for gripping a sheet 45 supplied by a device 52. Each device 49 oscillates in known manner about a respective axis perpendicular to wall 4 so that, as it travels through stations 47 and 44, jaws 50 travel and are maintained as long as possible perpendicular to a plane (not shown) through station 47, 44 and tangent to drum 42.

As shown in FIG. 1, on leaving station 47 and after receiving a chocolate 2 from device 46 and a respective sheet 45 from device 52, each device 49 folds sheet 45 into an L in known manner against a fixed plate 53 facing the periphery of drum 42 between stations 47 and 44 in the rotation direction of drum 42.

Sheet 45 is folded in a U about chocolate 2 as this is transferred from device 49 to a corresponding known gripping device 54 on drum 43 at station 44. Drum 43, rotating anticlockwise in FIG. 1 about axis 55 parallel to axis 48, feeds device 54 in known manner along a circular path and through a known folding station 56 where sheet 45 is closed about chocolate 2 to form a tubular wrapping which, as it travels in contact with a fixed plate 57, is engaged by an end closing device (not shown) prior to reaching output station 58.

Figure 4:
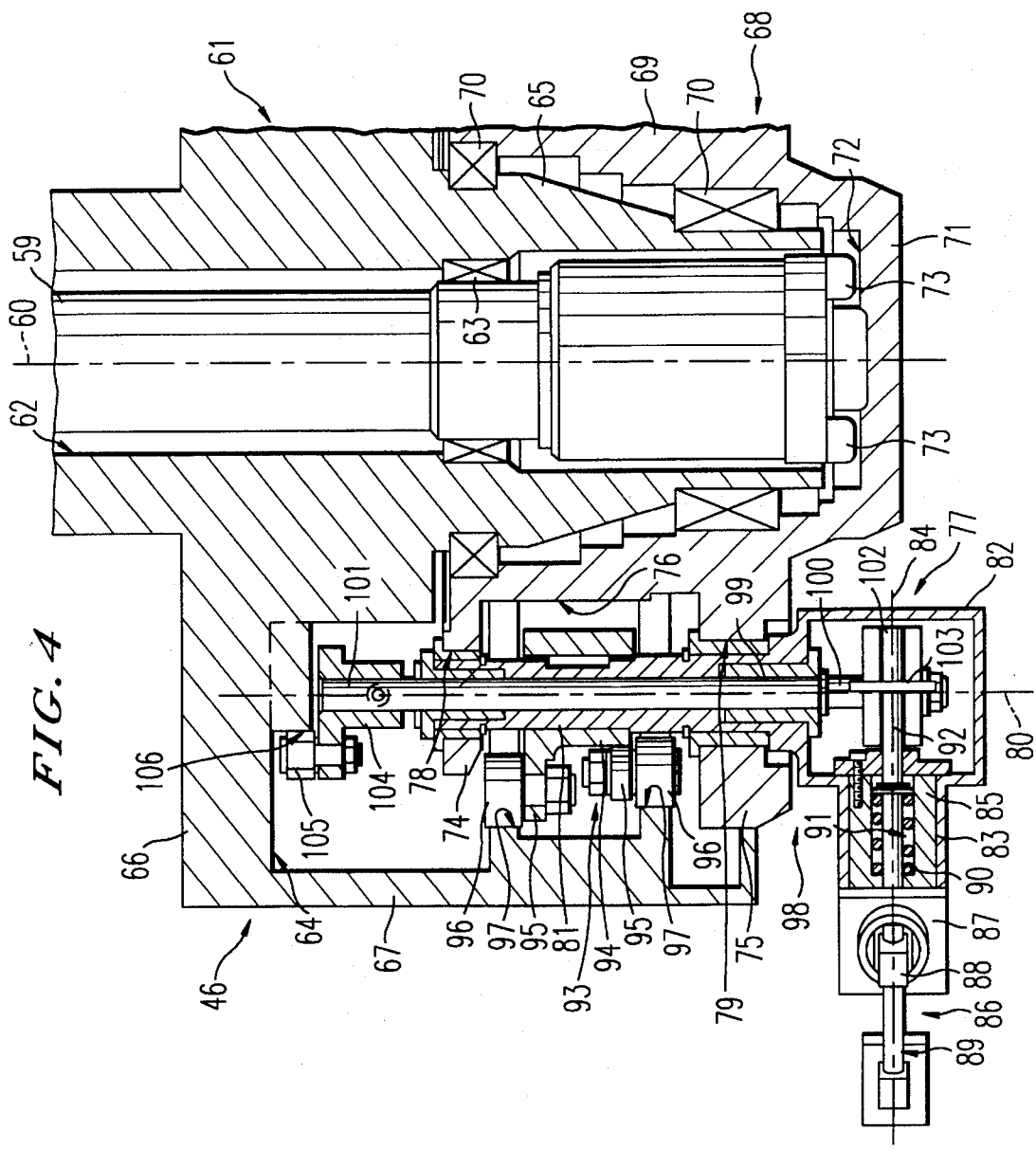
FIG. 4 shows a larger-scale partial axial section of a second detail in FIG. 1.

As shown particularly in FIG. 4, transfer device 46 comprises a drive shaft 59 fitted through wall 4 directly over the top of wheel 22 of feed device 5, and rotating anticlockwise (in FIG. 1) about a horizontal axis 60 parallel to axes 16 and 48; and a drum 61 coaxial with shaft 59 and supported in a fixed position on wall 4. Drum 61 presents an axial through hole 62 engaged by shaft 59 via the interposition of bearings 63; and, at the front, i.e. on the opposite side to that facing wall 4, an annular cavity 64 defining on drum 61 a central hub 65 fitted through with shaft 59 and having, on the end facing wall 4, an annular outer flange 66 from the outer periphery of which there extends frontwards an annular wall 67 coaxial with axis 60 and surrounding hub 65.

Hub 65 is fitted with a cup-shaped body 68 with its concavity facing wall 4, and comprising a lateral wall 69 extending coaxially with axis 60 inside a front portion of cavity 64 and connected in rotary manner to hub 65 via the interposition of bearings 70. Body 68 also comprises a bottom wall 71 perpendicular to axis 60 and having a diametrical inner groove 72 engaged by two axial appendixes 73 on shaft 59, for connecting body 68 angularly to shaft 59. Wall 69 presents a first and second annular outer flange 74 and 75 defining an annular groove 76 and extending perpendicular to axis 60, the first inside cavity 64, and the second so as to substantially close the inlet of cavity 64.

Body 68 supports a number of transfer units 77 equally spaced about axis 60 and each designed to pick up a chocolate 2 from device 5 at station 31, and transfer it to a gripping device 49 on drum 42 at station 47.

As shown in FIG. 4, for each unit 77, flanges 74 and 75 present respective holes 78 and 79 coaxial with a respective axis 80 parallel to axis 60; and each unit 77 comprises a sleeve 81 coaxial with respective axis 80 and mounted in rotary and axially-fixed manner through respective holes 78 and 79. The front end of sleeve 81 projecting frontwards of flange 75 is fitted integral with a hollow prismatic body 82 having a cylindrical tubular lateral appendix 83 with an axis 84 extending transversely and obliquely in relation to axis 80.

Appendix 83 is fitted through with a cylindrical body 85 of a gripping device 86 which, as shown in FIG. 2, comprises a substantially cup-shaped head 87 connected integrally to the end of body 85 projecting outwards of the free end of appendix 83. Head 87 supports two substantially radial rocker arms 88, a first arm of which extends inwards of head 87, and a second arm of which is fitted integral with a respective jaw 89 extending outwards in a direction substantially parallel to axis 84. Rocker arms 88 swing in opposite directions in a diametrical plane of head 87, so as to swing jaws 89, in said diametrical plane, from a normally closed position to an open operating position, and against the thrust exerted by a helical spring 90 coaxial with axis 84 and compressed inside an axial cavity 91 in body 85, between the end surface of cavity 91 and the plate of a shaft 92 controlling rocker arms 88 and an end portion of which extends inside body 82. Shaft 92 is coaxial with axis 84 and, when moved axially towards head 87 and against the action of spring 90, provides for rotating rocker arms 88 and opening jaws 89.

By means of a first actuating device 93, each gripping device 86 swings about respective axis 80 and about a central position wherein body 85 of device 86 is positioned substantially radially in relation to axis 60. As shown in FIG. 4, actuating device 93 comprises a bush 94 fitted to sleeve 81 between flanges 74 and 75 and having, at opposite ends, two radial, angularly offset appendixes 95 supporting respective revolving tappet rollers 96 parallel to axis 80 and cooperating with respective fixed drum cams 97 formed on the inner surface of wall 67. Cams 97 are so formed as to swing gripping devices 86 about respective axes 80 in such a manner that, on approaching station 31, each device 86 is positioned substantially perpendicular to a line tangent to wheel 22 and through station 31, and travels through station 31 substantially parallel to itself and moving axially first towards wheel 22 to grip chocolate 2, and then in the opposite direction to remove it. Similarly, cams 97 are so formed as to operate each device 86 in the same way at station 47, so as to enable chocolate 2 to be transferred from device 86 to device 49 as shown in FIG. 1, and in such a manner that devices 86 and 49 are maintained aligned with each other and travel a given distance substantially transversely to themselves.

Each device 86 also presents a second actuating device 98 for axially pushing shaft 92 against the action of spring 90 and so opening jaws 89.

Device 98 comprises a shaft 99 coaxial with axis 80 and fitted in rotary and axially-sliding manner through sleeve 81. Shaft 99 comprises a front portion 100 projecting frontwards from sleeve 81 and housed inside body 82; and a rear portion 101 housed inside cavity 64 behind flange 74. Portion 100 of shaft 99 presents a plate 102 from which projects laterally an appendix 103 in the form of a flat plate facing the inner end of shaft 92, substantially radial in relation to shaft 99, and, when idle, substantially perpendicular to axis 84.

As shown in FIG. 4, device 98 comprises a crank 104 fitted angularly to portion 101 of shaft 99 and in turn fitted with an eccentric pin on which is mounted for rotation a tappet roller 105 parallel to axis 80 and cooperating with a drum cam 106 formed on the rear portion of hub 65. Cam 106 is so formed as to rotate shaft 99 and appendix 103 first in one direction and then in the other about axis 80, so that appendix 103 axially displaces shaft 99 in such a manner that jaws 89 are opened before reaching station 31, closed at station 31, opened at station 47, and closed on leaving station 47.

In actual use, on reaching compacting device 6, chocolates 2 slide down along the air bed defined by conveyor 8 to conveyor 9 by, which they are directed on to a horizontal surface, still traveling in direction 7. Conveyor 9 is driven by motor 11 at a faster speed than that at which chocolates 2 travel down conveyor 8. Nevertheless, by virtue of the change in direction on passing from conveyor 8 to conveyor 9, chocolates 2 are compacted so as to substantially contact one another at the end of conveyor 8, and are then separated slightly on engaging conveyor 9.

As already stated, the speed of conveyor 9 is at least equal to, but normally greater than, that of conveyor 10, so that chocolates 2 are again compacted contacting one another as they proceed along conveyor 9. Successive compacting of chocolates 2 at the end of conveyor 8 and again along conveyor 9 provides for ensuring the formation of a stable orderly succession along conveyors 9 and 10, and for eliminating any "microgaps" between adjacent chocolates 2 at the bottom end of conveyor 8.

Said orderly succession is further stabilized by the weight of the line, of chocolates 2 formed on upward-sloping conveyor 10 along which chocolates 2 tend to slide backwards by force of gravity and so eliminate any gaps between adjacent chocolates 2.

The force of gravity acting on chocolates 2 entering loading station 30 combines with the breakaway thrust exerted on chocolates 2 by the pressurized air from holes 27 to prevent chocolates 2 from being carried along by friction by wheel 22, so that suction openings 25 actually act as seats for transporting chocolates 2 in equally spaced manner between loading station 30 and pickup station 31, and along an output portion, extending about axis 16, of a first curved path 107, the input portion of which is defined by feed device 5.

Each chocolate 2 is fed by wheel 22 to station 31 simultaneously with a respective transfer unit 77, the jaws 89 of which travel along a second curved path 108 extending about axis 60, substantially tangent to path 107 at station 31, coplanar with path 107, and oppositely concave in relation to path 107 at station 31. Jaws 89 of said unit 77 are opened by respective actuating device 98 and kept open up to station 31.

Device 86, on gripping respective chocolate 2, lifts it up towards station 47 where it is transferred to wrapping device 41.

I claim:

1. A wrapping method, particularly for food products, comprising the steps of feeding the products in an orderly spaced succession and along a first path to a pickup station by compacting said products along an input portion of said first path, so as to bring the products into contact with one another, and by accelerating the products along a further portion of the first path extending through the pickup station, so as to separate the products in an equally spaced manner; and successively gripping the products at the pickup station via pickup means moving along a second path for feeding the products to wrapping means; the first and second paths being curved paths substantially coplanar and substantially tangent to each other at the pickup station.

2. A method as claimed in claim 1, wherein the two paths are oppositely concave at the pickup station.

3. A method as claimed in claim 1 or 2, wherein the first and second paths are at least partly circular.

4. A method as claimed in claim 1, wherein said two paths extend at least partly about respective parallel axes.

5. A method as claimed in claim 4, wherein said axes are horizontal.

6. A wrapping machine, particularly for food products, comprising input feed means to a pickup station along a first path; means for wrapping said products; and pickup means moving along a second path for successively gripping the products at the pickup station and feeding the products to said wrapping means; the first and second paths being curved paths substantially coplanar and substantially tangent to each other at the pickup station; and said need means comprising means for compacting said products and means for accelerating said products; said compacting means being located upstream from said accelerating means and defining, for the products, in input portion of said first path; and said accelerating means being located at a further portion of the first path extending through the pickup station so as to separate the products in an equally spaced manner.

7. A machine as claimed in claim 6, wherein that said pickup means comprise at least a gripping device moving along said second path through said pickup station; the gripping device comprising movable jaw means for gripping a respective product at the pickup station.

8. A machine as claimed in claim 6, wherein the two paths are oppositely concave at the pickup station.

9. A machine as claimed in claim 6, wherein the first and second paths are at least partly circular.

10. A machine as claimed in claim 6, wherein said two paths respectively extend at least partly about a first and second axis parallel to each other.

11. A machine as claimed in claim 10, wherein said axes are horizontal.

12. A machine as claimed in claim 6, wherein said accelerating means comprise a wheel rotating about said first axis and presenting an orderly succession of peripheral suction openings, each defining a respective transportation seat for a respective said product; said pickup station being located at the top of said wheel.

13. A machine as claimed in claim 12, wherein said wheel is provided with blowing means interposed between each pair of adjacent said suction openings.

14. A machine as claimed in claim 12 or 13, wherein the input portion of said first path comprises a downward-sloping input portion, a substantially flat intermediate portion, and an upward-sloping output portion, each respectively defined by an input conveyor, and an output conveyor, and an output conveyor in series with one another; the output conveyor being tangent to said wheel at a loading station upstream from said pickup station.

15. A machine as claimed in claim 14, wherein drive means are provided for operating the intermediate conveyor at a speed at least equal to that of the output conveyor and less than the surface speed of said wheel.

\* \* \* \* \*